United States Patent
Bernert et al.

(10) Patent No.: US 10,598,243 B2
(45) Date of Patent: Mar. 24, 2020

(54) SPRING CARRIER (71) Applicant: LISEGA SE, Zeven (DE)

(72) Inventors: Joerg Bernert, Zeven-Hofkoh (DE);
Ekkehard Heinrichs, Zeven (DE);
Arnold Radtke, Zeven (DE)

(73) Assignee: LISEGA SE, Zeven (DE)

( * ) Notice: Subject to any disclaimer, the term of this patent is extended or adjusted under 35 U.S.C. 154(b) by 205 days.

(21) Appl. No.: 15/557,903

(22) PCT Filed: Mar. 11, 2016

(86) PCT No.: PCT/EP2016/055272
§ 371 (c)(1),
(2) Date: Mar. 6, 2018

(87) PCT Pub. No.: WO2016/146517
PCT Pub. Date: Sep. 22, 2016

(65) Prior Publication Data
US 2018/0172099 A1 Jun. 21, 2018

(30) Foreign Application Priority Data
Mar. 13, 2015 (DE) .................. 10 2015 103 716

(51) Int. Cl.
F16F 1/12 (2006.01)
F16L 3/205 (2006.01)

(52) U.S. Cl.
CPC .............. F16F 1/128 (2013.01); F16L 3/205 (2013.01); F16F 2226/04 (2013.01);
(Continued)

(58) Field of Classification Search
CPC .. F16F 1/128; F16F 226/04; F16F 2230/0041; F16F 2230/36; F16L 3/2053; F16L 3/205
See application file for complete search history.

(56) References Cited

U.S. PATENT DOCUMENTS 2,417,154 A  3/1947 Dath
RE22,980 E  3/1948 Donkersley et al.
(Continued)

FOREIGN PATENT DOCUMENTS

DE  69703509  5/2001
EP  0184404   6/1986
(Continued)

OTHER PUBLICATIONS

Search Report from corresponding German Patent Appln. No. 102015103716.5 dated Mar. 13, 2015.
(Continued)

Primary Examiner — Xuan Lan Nguyen
(74) Attorney, Agent, or Firm — Grossman, Tucker, Perreault & Pfleger, PLLC (57) ABSTRACT A spring carrier comprising a casing tube having a longitudinal axis; a spring plate, a base plate and a spring disposed inside the casing tube between an upper and a lower boundary element; the lower boundary element having a projection arrangement having retaining projections disposed on the casing tube; the base plate having a recess arrangement on an outer surface facing the casing tube; wherein the projection arrangement and the recess arrangement are arranged such that, in a mounting situation, all the retaining projections are disposed next to the base plate and, in an operational situation, the projection arrangement overlaps with the base plate, wherein a locking projection is disposed inside the casing tube and the base plate has locking recesses facing the casing tube, wherein the locking projection is disposed inside a first locking recess in the mounting situation and a second locking recess in the operational situation.

26 Claims, 5 Drawing Sheets (52) U.S. Cl.
  CPC ... *F16F 2230/0041* (2013.01); *F16F 2230/36* (2013.01); *F16L 3/2053* (2013.01)

(56) References Cited

U.S. PATENT DOCUMENTS

| | | |
|---|---|---|
| 4,176,815 A | 12/1979 | Davidson et al. |
| 5,833,098 A | 11/1998 | Gomi |

FOREIGN PATENT DOCUMENTS

| | | |
|---|---|---|
| EP | 1295845 | 3/2003 |
| FR | 2365727 | 4/1978 |
| GB | 2029928 | 3/1980 |

OTHER PUBLICATIONS

English translation of International Search Report dated May 24, 2016.

English translation of the International Preliminary Report on Patentability from corresponding PCT Application No. PCT/EP2016/055272 dated Mar. 2, 2017.

SPRING CARRIER

FIELD

This invention relates to a spring carrier for use in plant construction for resiliently carrying a load as well as to a method for producing a spring carrier.

BACKGROUND

Generic spring carriers are usually used for plant construction for the resilient support of pipes or of components such as, for example, valves. This being, generic spring carriers make possible the resilient carrying of a load up to a nominal load that is defined by the construction of the respective spring carrier, in particular by the spring used therein. Spring carriers with different nominal loads exist for different applications; typically, the nominal loads of generic spring carriers are situated between 0.5 kN and 500 kN. Depending on the application, generic spring carriers can be designed as spring hangers or as spring supports. A spring support is designed to be mounted on a carrier, the spring support having a carrier element that forms the upper end of the spring support and on which a load such as, for example, a tube can be resiliently supported. A spring hanger is designed to be hung to a carrier or to be laid onto a carrier, the spring hanger having a carrier element that forms the lower end of the spring hanger, whereby a load such as, for example a tube, can be resiliently suspended to the carrier element.

Generic spring carriers comprise a casing tube, the cylinder axis of which extends in a longitudinal direction. A base plate, a spring plate and a spring are placed in the casing tube in the longitudinal direction between an upper boundary element and a lower boundary element, the spring being placed between the spring plate and the base plate and applying a spring force to the base plate and the spring plate. The spring plate is connected to a carrier element of the spring carrier. The boundary elements are of significant importance since they limit the longitudinal displacement path of the spring plate inside the casing tube. In unloaded condition, the upper boundary element absorbs the spring force acting onto the spring plate and the lower boundary element the spring force acting onto the base plate. In loaded condition, a load is applied to the spring plate by the carrier element so that the spring is compressed in the longitudinal direction and the spring plate is no longer applied to the upper boundary element. In loaded condition, the lower boundary element also absorbs the force of the spring acting onto the base plate, this force being composed of the spring force in unloaded condition and of the weight force of the load.

Usually, the boundary elements are often produced by bending the casing tube. However, other possibilities are also known for the implementation of the boundary elements, for example the welding of boundary elements to the inner circumference of the tube casing, for example the welding of a flange to the outer surface of the casing tube and the subsequent screwing of a boundary plate to the flange for constituting a boundary element. This being, usually the upper boundary element is first produced by bending the casing tube, whereupon the spring plate, the spring and the base plate are inserted into the casing tube by compressing the spring, whereupon the lower boundary element is then produced in a further bending step. A reliable fixing of the spring plate, of the spring and of the base plate in the casing tube can thus be achieved. Spring carriers that should be appropriate for the use under slightly corrosive conditions can be protected against corrosion by a paint coat or by electro galvanizing before and/or after the bending steps.

However, the production of spring carriers for highly corrosive environments is problematic. For such spring carriers, the casing tube has imperatively to be provided with a sufficiently thick protective layer against corrosion, which usually takes place through hot-dip galvanizing. A bending of the casing tube after having applied an appropriately thick protective layer is no longer possible since this would result in a destruction of the protective layer in the bending area. However, at the same time the hot-dip galvanizing of the casing tube is no longer possible when the spring is in the casing tube since the spring properties of the spring would be considerably impaired by the high temperatures of hot-dip galvanizing, if not even destroyed. For this reason, in case of traditional spring carriers for highly corrosive environments, the casing tube usually comprises a tube section and a plate section welded at the lower end of the pipe section, an upper boundary element formed by bending the tube section being placed at the upper end of the tube section. In such spring carriers, the base plate is not placed inside the casing tube but is screwed from below to the plate section of the casing tube. There is no problem to hot-dip galvanize the casing tube, whereupon the spring plate and the spring can be inserted from below into the casing tube and the base plate can be screwed by compressing the spring against the plate section.

A spring carrier with a sufficiently thick protective layer against corrosion can certainly be produced but such a construction gives rise to crucial disadvantages. So, for example, the screws with which the base plate is screwed against the plate section of the casing tube are necessarily in the longitudinal direction and thus in direction of the force that the spring exerts onto the base plate and that is composed of the spring force in unloaded condition of the spring carrier as well as of the weight force of the load resiliently supported by the spring carrier. This can easily result to an overloading of the screws and to a damaging of the spring carrier. Moreover, the production of such a spring carrier is costly since first the welding of a plate section to a tube section for producing the casing tube and then a costly screwing of the base plate to the plate section are necessary. In EP 0 184 404 A1, for example, a spring carrier is disclosed that has a casing tube in which an upper plate and a lower plate are placed as components separated from the casing tube. The spring carrier can be suspended to the upper plate; a coil spring by which a load can be resiliently carried is supported on the lower plate. The upper plate as well as the lower plate is respectively supported on projections provided in the casing tube, the upper plate being twist-secured by pins that are inserted laterally into the plate through feedthroughs of the casing tube. In U.S. Pat. No. 2,417,154 A, a spring carrier is disclosed that has a casing tube that is closed at one end by an end cap designed as a separate component. Springs by which a load can be resiliently carried are supported on the end cap. The end cap has several projections spaced from each other over the circumference and is supported in the casing tube by these projections in that these projections of the end cap are supported on projections that are provided in the casing tube. Furthermore, guiding ribs that bear on the projections of the end cap and that prevent a twisting of the end cap and thus a loosening of the end cap from the casing tube are provided on the casing tube. A spring carrier that is designed as a spring support is disclosed in FR 2 365 727 A1. A spring carrier that comprises a casing tube that is closed at one end by a base plate to which a spiral coil is supported for bearing a load is disclosed in U.S. Pat. No. 4,176,815 A. The base plate is designed as a separate component and is supported in the casing tube by means of a bayonet lock. A spring carrier that comprises a casing tube is disclosed in GB 2 029 928 A, casing tube in which a lower pressure ring and an upper pressure ring are placed as separate components, Woodruff keys being placed between the pressure rings. The lower pressure ring is supported on projections provided in the casing tube and the upper pressure ring is supported in the casing tube, the casing tube being pressed-in above the pressure ring by maintaining a pressure onto the upper pressure ring. A spring carrier that has a casing tube is disclosed in US re. 22,980 E, an upper plate and a lower plate being placed in the casing tube, the upper plate as well as the lower plate being welded with the casing tube.

SUMMARY

The aim of this invention is to make available a spring carrier that at least partially eliminates one of the above described drawbacks of traditional spring carriers. Moreover, the aim of this invention is to make available a method for producing a spring carrier that at least partially eliminates one of the drawbacks described above.

As a solution for the aim of the invention, this invention proposes a spring carrier for use in plant construction for resiliently carrying a load. The spring carrier is appropriate for being used in plant construction for resiliently carrying a load and comprises a casing tube that is designed as a hollow cylinder. The cylinder axis of the hollow cylinder extends in a longitudinal direction and the inner circumference of the hollow cylinder surrounds a clear cross-section of the tube. In an embodiment, the clear cross-section of the tube is constant over at least 80% of the extension of the casing tube in the longitudinal direction. In an embodiment, the casing tube can have stages, the clear cross-section of the tube varying gradually. It is essential that the casing tube has an inner circumference that surrounds the clear cross-section of the tube so that the hollow cylinder shape, in particular the shape of a straight hollow cylinder, is given. In an embodiment, the inner circumference can surround the clear cross-section of the tube in a fully enclosed manner In an embodiment, the inner circumference has recesses so that it cannot surround the clear tube cross-section of the casing tube in a fully enclosed manner The casing tube can have different designs of its outer surface. For example, the casing tube can have projections on its outer surface. For example, the casing tube can comprise a tube section and in particular a support plate, the tube section extending in particular in the longitudinal direction and having a constant clear tube cross-section over its section length in the longitudinal direction, the support plate being placed in particular at one end in the longitudinal direction of the tube section and having a recess that is placed aligned with the clear tube cross-section of the tube section so that the support plate forms a section of the inner circumference of the casing tube in the area of the recess. In an embodiment, the casing tube is made of one tube section. In an embodiment, the casing tube is made of steel. In an embodiment, the casing tube is hot-dip galvanized. The casing tube can extend in the longitudinal direction over a length between approximately 150 mm and 1500 mm.

The spring carrier according to the invention has a spring plate, a base plate and a spring. In an operational situation of the spring carrier, the spring plate, the base plate and the spring are placed inside the casing tube and in the longitudinal direction between an upper boundary element and a lower boundary element, the spring being placed in the longitudinal direction between the base plate and the spring plate and acting onto the spring plate and onto the base plate respectively with a spring force acting parallel to the longitudinal direction. The spring plate is connected with a carrier element for resiliently carrying a component and can displace in the longitudinal direction within a displacement area limited by the boundary elements. The boundary elements can be fixedly connected with the casing tube, in particular can be integrated in one piece in the casing tube. This being, the boundary elements predefine a boundary of the displacement area since the base plate and the spring plate are maximally spaced from each other in the longitudinal direction when the base plate is pressed by the spring against the lower boundary element and the spring plate is pressed by the spring against the upper boundary element. This situation corresponds to the unloaded operational situation of the spring carrier. For a load of the carrier element with a sufficiently heavy load, which corresponds to an operational situation in loaded condition of the spring carrier, the spring can be compressed between the base plate and the spring plate so that the spring plate gets closer to the base plate. In an embodiment, the upper boundary element can be produced by bending the casing tube at its upper end. For example, the upper boundary element can be made of a projection created by bending the casing tube. For example, a connection plate can be placed between the upper boundary element and the spring plate, wherein, in the unloaded operational situation, the spring plate bears on the connecting plate and exerts a force through the spring force onto the connecting plate towards the upper boundary element.

According to the invention, the lower boundary element has a projection arrangement with retaining projections that are placed on the inner circumference of the casing tube, the base plate having a recess arrangement on the outer surface thereof facing the inner circumference of the casing tube. The projection arrangement and the recess arrangement are designed to correspond to one another so that, in a mounting situation, in which the base plate is placed in a first angular position relative to the casing tube with respect to a rotation about the cylinder axis inside the casing tube, the entire projection arrangement can be placed perpendicularly to the longitudinal direction next to the base plate and in the operational situation, in which the base plate is placed in a second angular position relative to the casing tube, the projection arrangement perpendicularly the longitudinal direction overlaps with the base plate for absorbing a force exerted by the spring onto the base plate.

In an embodiment, the retaining projections are produced by bending the casing tube. In an embodiment, the retaining projections are produced by punching and bending the casing tube. In an embodiment, the retaining projections are formed by the shape of a recess of a plate that is enveloped by the casing tube and that is connected in one piece with a tube section of the casing tube, and is, for example, welded therewith. The recess arrangement is formed by the configuration of the outer surface of the base plate facing the inner circumference of the casing tube. In an embodiment, the recess arrangement is ensured by the configuration of the base plate with a cross-section perpendicularly to the longitudinal direction in the manner of a polygon. In an embodiment, the recess arrangement is ensured in that the base plate is designed in such a manner that a circle can be laid as an envelope around the cross-section thereof perpendicularly to the longitudinal direction, recesses being provided as edge recesses, whereby the cross-section in the area of these edge recesses differs from the circular shape, the distance between the circle center and the outer surface being smaller than the radius of the circle in the area of the edge recess.

Due to the corresponding design of the projection arrangement and of the recess arrangement, it is ensured that the base plate can be inserted, in the mounting situation, from outside the casing tube from below into the casing tube and can be guided past the projection arrangement along the longitudinal direction since, in the mounting situation, the entire projection arrangement can be placed next to the base plate perpendicularly to the longitudinal direction. On the other hand, the corresponding design of the recess arrangement and of the projection arrangement simultaneously ensures that, in the operational situation that differs from the mounting situation in particular only by a rotation of the base plate relative to the casing tube about the cylinder axis by the angular difference between the first and the second angular position, the projection arrangement overlaps with the base plate perpendicularly to the longitudinal direction so that the retaining projections of the projection arrangement can absorb the force that is exerted by the spring onto the base plate in the operational situation. The projection arrangement with its retaining projections thus acts in the operational situation as lower boundary element that fixes, together with the upper boundary element, the maximal distance between the base plate and the spring plate in the operational situation.

In an embodiment, the projection arrangement can be designed in such a manner that, in the operational situation, it overlaps with the base plate perpendicularly to the longitudinal direction by being distributed over the circumference so that a circumferential absorbing of the force acting onto the base plate that the spring exerts onto the base plate in the operational situation is ensured. In the unloaded operational situation, this force is fixed exclusively by the design of the spring and by the distance between the spring plate and the base plate. In an operational situation under load, the force acting onto this base plate is given by the sum of the spring force in the unloaded operational situation and of the weight force that is applied by a load on the carrier element. In an embodiment, the spring carrier can be alternately brought into the mounting situation and into the operational situation. In an embodiment, during its production, the spring carrier is at least once in the mounting situation and is brought during its production in its operational situation with the second angular position of the base plate relative to the casing tube, the operational situation being ensured, for example, by setting a welding point between the base plate and the casing tube so that the produced spring carrier can no longer readily be brought into the mounting situation.

The spring carrier according to the invention implies different advantages. On the one hand, the casing tube and/or the base plate, and in particular the spring plate, can be galvanized independently from each other and especially also independently from the spring so that a hot-dip galvanizing for producing a sufficiently thick protective layer is also made possible. On the other hand, a particularly simple and cost-effective production of the spring carrier is made possible since no complicated screwing is necessary for the production but the spring plate, the spring and the base plate can easily be inserted into the casing tube and can be secured only by twisting the base plate in the casing tube. Furthermore, due to the projection arrangement, a particularly robust lower boundary element that is very reliable and durable can be made available.

In an embodiment, the projection arrangement has several retaining projections respectively spaced from each other by a retaining projection angular distance. In an embodiment that can be combined with this embodiment, the recess arrangement has several recesses respectively spaced from each other by a recess angular distance. A particular retaining projection angular distance is always associated to a particular pair of adjacent retaining projections wherein, in an embodiment, the retaining projection angular distance is identical for each pair of retaining projections so that all the adjacent retaining projections have the same retaining projection angular distance to one another while, in another embodiment, the retaining projection arrangement angular distance can vary depending on the respective pair of retaining projections. A particular recess angular distance is always associated to a particular pair of adjacent recesses whereby, in an embodiment, the recess angular distance is identical for each pair of recesses so that all the adjacent recesses have the same recess angular distance to one another while, in another embodiment, the recess angular distance can vary depending on the respective pair of recesses. The recess arrangement of the base plate is formed in that the cross-section of the base plate perpendicularly to the longitudinal direction is configured in such a manner that the radius of the base plate that is defined as the length of extension between the center of the base plate and the outer surface facing the inner circumference of the casing tube varies depending on an angle of rotation about the longitudinal direction so that the radius can be expressed as a function depending on the angle of rotation, whereby the spot of a recess can be defined by a local minimum of this function and the recess angular distance between two recesses can be defined by the angular distance between the spots of the two recesses. The center of the cross-section of the base plate can, for example, coincide with the center of gravity of the base plate and/or the cylinder axis can penetrate through the center. In a corresponding way, the projection arrangement of the casing tube causes a variation of the clear cross-section of the tube so that the radius of the tube cross-section that is fixed by the distance between the cylinder axis and the inner circumference perpendicularly to the longitudinal direction varies depending on an angle of rotation about the cylinder axis, the projections being placed at the spots at which the function of the radius has a local minimum depending on the angle of rotation, whereby the retaining projection angular distance can be fixed by the angular distance between the local minima of the radius of the clear cross-section of the tube.

In an embodiment, the recesses are uniformly distributed over the outer surface of the base plate, wherein in particular the recess angular distance between all the adjacent recesses is identical. Alternatively or simultaneously, the retaining projections can be uniformly distributed over the inner circumference of the casing tube, whereby in particular the retaining projection angular distance between all the adjacent retaining projections can be identical. The uniform distribution of the retaining projections can result in the advantage that, in the operational situation, the base plate can be uniformly supported over the circumference by the retaining projections so that a circumferentially uniform force transfer from the base plate to the retaining projections can take place so that the base plate can be held in place in a particularly stable manner by the lower boundary element formed by the projection arrangement while it is loaded with a force by the spring. The uniform distribution of the recesses can result in the advantage that the base plate can be oriented particularly easily for achieving the mounting situation and can thus be inserted into the casing tube past the retaining projections. Particularly preferably, the recess angular distance and/or the retaining projection angular distance is at least 60°, in particular is an angle between 90° and 150°. A circumferential support of the base plate by the projection arrangement and an easy insertion of the base plate into the mounting tube can thus be simultaneously be ensured in the mounting situation.

In an embodiment, the number of the retaining projections is at most as large as the number of the recesses, whereby, the number of the retaining projections can correspond in particular to the number of the recesses. The assembly of the spring carrier is thus particularly simplified since the mounting situation can be achieved by the simple alignment of the base plate to the casing tube and, moreover, a reliable force transfer from the base plate to the retaining projections can be ensured in the operational situation. Particularly preferably, the number of the retaining projections and/or the number of the recesses is at least three, in particular is exactly three, in particular between three and five, the recesses and/or the retaining projections having in particular a respectively identical design and being respectively spaced from each other by the same angular distance. The inventors found that, with the specified limitation of the number of the retaining projections and/or of the recesses, a particularly robust base plate and a particularly robust casing tube can be produced which makes possible a robust configuration of the spring carrier on the whole and that, furthermore, a particularly simple alignment of the base plate to the casing tube for achieving the operational situation and the mounting situation is possible.

The retaining projections and/or the recesses preferably have preferably a cross-section in the shape of a segment of a circle perpendicularly to the longitudinal direction. The cross-section in the shape of a segment of a circle is formed by the extension in the shape of a segment of a circle of the outer surface of the base plate in the angle area of a recess or by the extension in the shape of a segment of a circle of the inner circumference in the angle area of a retaining projection. The retaining projections can thus be designed in a particularly robust manner, and an alignment of the base plate to the casing tube is particularly simplified. The retaining projections are preferably designed in such a manner that each retaining projection forms on its upper side a bearing surface extending perpendicularly to the longitudinal direction, in particular the bearing surfaces of all the retaining projections being situated in the same surface plane. Particularly preferably, at least one of the retaining projections, in particular the majority of the retaining projections, is produced, wherein in a first step the casing tube is notched sectionwise perpendicularly to the longitudinal direction, for example in a punching step, in a subsequent step a section of the casing tube to be bent is bent below the cut so that the cut upper side of the section to be bent forms the bearing surface of the retaining projection. A retaining projection can thus be produced in a particularly simple and in a particularly robust and precise manner Particularly preferably, the bearing surface of at least one, in particular of the majority of the retaining projections, is configured as a segment of a circular ring, wherein in particular the thickness of the circular ring can be identical with the wall thickness of the casing tube.

In an embodiment, the casing tube has a circular cross-section, in particular the cross-section of the base plate as an envelope having the shape of a circle, the recesses being spaced from each other by circular arc segments of the enveloping circular shape. The angle area over which a recess extends is fixed in that the radius of the base plate in the angle area is smaller than the radius of the envelope. The providing of the casing tube with a circular cross-section allows a simple rotation of the base plate about the cylinder axis for adjusting the first and the second angular position relative to the casing tube. The configuration of the base plate in such a manner that its cross-section as an envelope has a circular shape can particularly preferably contribute to the easy setting of the angular positions in connection with providing a circular cross-section for the casing tube. The recesses can be spaced from each other by circular arc sections of the enveloping circular shape, whereby a particular recess can extend over an angle section between two circle segments of the envelope, whereby the center of the angle area can be defined as the spot of the recess, whereby the angular distance between recesses can be defined over the corresponding angular distance between the spots that is fixed by an angle of rotation about the cylinder axis.

According to the invention, at least one locking projection is placed inside the casing tube and is offset upwards from the projection arrangement, the base plate having at least two locking recesses spaced from each other at a locking angular distance on its outer surface facing the inner circumference of the casing tube. The locking projection and the two locking recesses are designed corresponding to each other in such a manner that, in the mounting situation, the locking projection is placed perpendicularly to the longitudinal direction inside a first of the two locking recesses and the locking projection is placed, in the operational situation, inside a second of the locking recesses. For an arrangement of the locking projection "inside" a locking recess perpendicularly to the longitudinal direction, the base plate is always placed perpendicularly to the longitudinal direction next to the locking projection. In the mounting situation, the locking projection can be placed, depending on the position of the base plate, along the longitudinal direction relative to the casing tube at the level of the base plate or along the longitudinal direction offset to the base plate. Due to the arrangement of the locking projection perpendicularly to the longitudinal direction inside the first locking recess, the base plate is able to move along the longitudinal direction inside the casing tube without the locking projection being able to inhibit the ability of the base plate to move. In the operational situation in which the base plate bears on the projection arrangement, the locking projection is placed inside the second locking recess and thus at the level of the base plate. The thickness of the base plate thus corresponds to the distance between the locking projection and the projection arrangement in the longitudinal direction so that the locking projection is situated in the operational situation at the level of the base plate. The distance is thus in particular less than the thickness of the base plate. The locking projection and the second locking recess are designed corresponding to each other in such a manner that, in the operational situation, a rotation of the base plate is inhibited by the interaction of the locking projection and of the second locking recess since, in trying to twist the base plate relative to the casing tube, the locking projection would hit the edges of the locking recess formed by the base plate, locking recess in which the radius of the base plate increases. In the described embodiment, a change of the operational situation into the mounting situation is thus only possible for the embodiment described when the base plate is placed in the longitudinal direction above the locking projection. The advantageous embodiment described thus allows at the same time, besides the particularly easy production of the spring carrier according to the invention, a locking of the angular position of the base plate relative to the casing tube in the operational situation. In this regard, it must be considered that the spring in every operational situation always does exert a spring force downwards onto the base plate that is transferred into the casing tube by the projection arrangement. Thus, an excursion of the base plate upwards away from the projection arrangement may not take place for a normal use of the spring carrier so that a loosening of the locking of the base plate relative to the casing tube is excluded in a normal operational situation.

Particularly preferably, the first and the second of the locking recesses are placed in an angle section between two adjacent recesses. This ensures that the angle of rotation between the first and the second angular position is substantially smaller than the recess angular distance of the two adjacent recesses. Two retaining projections that are associated to the two adjacent recesses can thus be placed in the mounting situation perpendicularly to the longitudinal direction inside the recesses and can be placed, in the operational situation, sufficiently spaced from the recesses so that the retaining projections associated to the two adjacent recesses can provide a reliable support of the base plate in the operational situation.

In an embodiment, the locking angular distance between the first and the second of the locking recesses is between 0.25 and 0.75, in particular 0.5 of the recess angular distance between the two adjacent recesses. Particularly preferably, the angular distance between one of the adjacent recesses and its adjacent locking recess can be respectively between 0.2 and 0.4, in particular 0.25 of the recess angular distance, and/or half the locking angular distance. Particularly preferably, the recess angular distance between the two adjacent recesses is 120° and the locking angular distance is 60°. The inventors found that, in the operational situation, a particularly robust configuration of the base plate can be ensured by providing said angular distances and a particularly reliable support of the base plate by the projection arrangement since the retaining projections are then spaced in the operational situation at a sufficient distance from the recesses of the base plate. Moreover, a particularly easy mounting and/or alignment of the base plate for achieving the first angular position and the second angular position is made possible by the symmetric design of the distances, i.e. by providing respectively the same distance between one of the adjacent recesses and the locking recess adjacent thereto as well as by providing the locking angular distance as half the recess angular distance of the adjacent recesses.

In an embodiment, the cross-section of the locking projection perpendicularly to the longitudinal direction is less than one third of the mean cross-section of the retaining projections. This being, the mean cross-section of the retaining projections designates the mean value from the cross-sections of the retaining projections, wherein in general the cross-section of a projection can be defined by means of the surface by which the respective projection reduces the clear cross-section of the tube perpendicularly to the longitudinal direction. The inventors found that providing a relatively small locking projection is already sufficient to block the angular position in the operational situation and that providing a small locking projection simultaneously allows a particularly stable design of the base plate and of the casing tube, whereas the retaining projections have to be provided large enough to ensure a sufficiently good support of the base plate. Particularly preferably, the retaining projections and/or the locking projection is configured as bent portions of the casing tube. For example, the locking projection can be produced by a single bending step. For example, at least one of the retaining projections can be produced by a cutting and bending process as described above.

In an embodiment, the spring carrier is designed as a spring support, wherein the casing tube has a support plate at its lower end. The support plate has a recess that forms a section of the inner circumference of the casing tube. The spring plate, the spring and the base plate can be inserted from outside into the casing tube through the recess. In the operational situation in which the spring plate, the spring and the base plate are placed, as explained, inside the casing tube, the carrier element placed on the spring plate projects from the inside of the casing tube at the upper end of the casing tube beyond the casing tube. Thus, the spring carrier designed as a spring support is designed to be set with its support plate onto a carrier such as, for example, a ground, whereby a load that can be then resiliently carried by the spring support can be set onto the carrier element from above.

In an embodiment, a guiding tube that extends, in the operational situation, upwards from the base plate and that is designed to guide the carrier element and/or the spring plate is placed on the base plate. The guiding tube can thus absorb loads of the spring carrier perpendicularly to the longitudinal direction so that damaging of the spring can be effectively avoided. Particularly preferably, the projection arrangement is placed on the support plate. This results in the advantage that the projection arrangement can be particularly easily produced when producing the support plate. The casing tube can, for example, comprise a tube section and the support plate. The support plate can, for example, be fixed in one piece to the tube section, for example, by welding. In the operational situation, the spring plate can move within a displacement area in the longitudinal direction inside the tube section. The locking projection can, for example, be placed on an inner circumference section outside the support plate; it can, for example, be produced by bending the tube section above the support plate. In an embodiment, the locking projection is produced in that the tube section is notched at its lower end before the support plate is assembled in one piece on the tube section and is then bent in the notched section, whereupon the support plate is fixed at the bottom of the tube section. In an embodiment, the locking projection is configured as a pin mounted on the support plate.

In an embodiment, the spring carrier is designed as a spring hanger, wherein the base plate has a recess through which, in the operational situation, the carrier element projects from the inside of the casing tube at the lower end of the casing tube beyond the casing tube. Such a spring hanger can, for example, be set on two adjacent carriers, the carrier element extending downwards between the carriers so that a load can be suspended on the carrier element by being resiliently supported. Such a spring hanger can alternatively be suspended and fixed to a carrier, a hanging connection being provided between the casing tube and the carrier, whereupon a load can then be resiliently carried by the carrier element projecting downwards. In an embodiment, a connecting plate is provided between the spring plate and the upper boundary element, this plate bearing, in the operational situation, on the upper boundary element and by which the spring hanger can be mounted to a suspension, for example, to a suspension of a carrier. The connecting plate can be configured accordingly in a conventional manner.

Furthermore, the invention relates to a method for producing a spring carrier. In the method according to the invention, in a first step, a spring plate, a spring and a base plate are inserted successively in a longitudinal direction into a casing tube in the shape of a hollow cylinder from bottom to top in the longitudinal direction, the cylinder axis of the casing tube extending in the longitudinal direction. During the first step, the base plate is supported in a first angular position relative to the casing tube with respect to a rotation about the cylinder axis. This being, a whole projection arrangement that is placed on the inner circumference of the casing tube is placed perpendicularly to the longitudinal direction next to the base plate while the base plate is inserted into the casing tube by exerting a force along the longitudinal direction and by compressing the spring against its spring force until it is placed above the retaining projections. Thereafter, during a second step, the base plate is twisted starting from the first angular position relative to the casing tube to a second angular position in which the projections overlap with the base plate perpendicularly to the longitudinal direction. Of course, a force is further exerted onto the base plate along the longitudinal direction during the second step by maintaining the compression of the spring. In a third step, the base plate is then lowered on the projection arrangement by reducing the force exerted. The method according to the invention makes possible a particularly easy production of a particularly reliable spring carrier and implies further advantages that are evident from the description above of the spring carrier according to the invention. The method according to the invention can have further characteristics that are apparent from the description above of the spring carrier according to the invention.

According to the invention, during the first step, the base plate is inserted into the casing tube along the longitudinal direction until it is placed above a locking projection that is placed on the inner circumference of the casing tube above the projection arrangement. During the second step, the base plate is twisted relative to the casing tube until the locking projection is placed perpendicularly to the longitudinal direction and overlaps with a locking recess of the base plate, the locking projection being placed during the third step inside the locking recess in such a manner that it is enclosed between the base plate and the casing tube perpendicularly to the longitudinal direction. After having completed the third step, a twisting of the base plate is thus excluded without the base plate being beforehand displaced by applying a considerable force along the longitudinal direction upwards from the projection arrangement and beyond the locking projection. The twisting of the base plate during the second step starting from the first angular position to the second angular position is preferably at least 30°, in particular less than 90°, in particular between 45° and 75°.

BRIEF DESCRIPTION OF THE DRAWINGS

The invention will be described in detail below with reference to various embodiments illustrated in five figures.

FIG. 1a shows a schematic diagram of an embodiment of the spring carrier according to the invention that is designed as a spring hanger;

FIG. 1b shows an enlarged detail of FIG. 1a;

FIG. 5b shows in a schematic diagram a perspective view on the spring carrier shown in FIG. 5a;

FIG. 6b shows in a schematic diagram a bottom view of the spring carrier shown in FIG. 6a.

DETAILED DESCRIPTION

An embodiment of a spring carrier according to the invention configured as a spring hanger 100 is represented in the FIGS. 1 to 4. A spring hanger 100 is schematically represented in FIG. 1a in a half section in an unloaded operational situation.

Figures 1A, 1B:
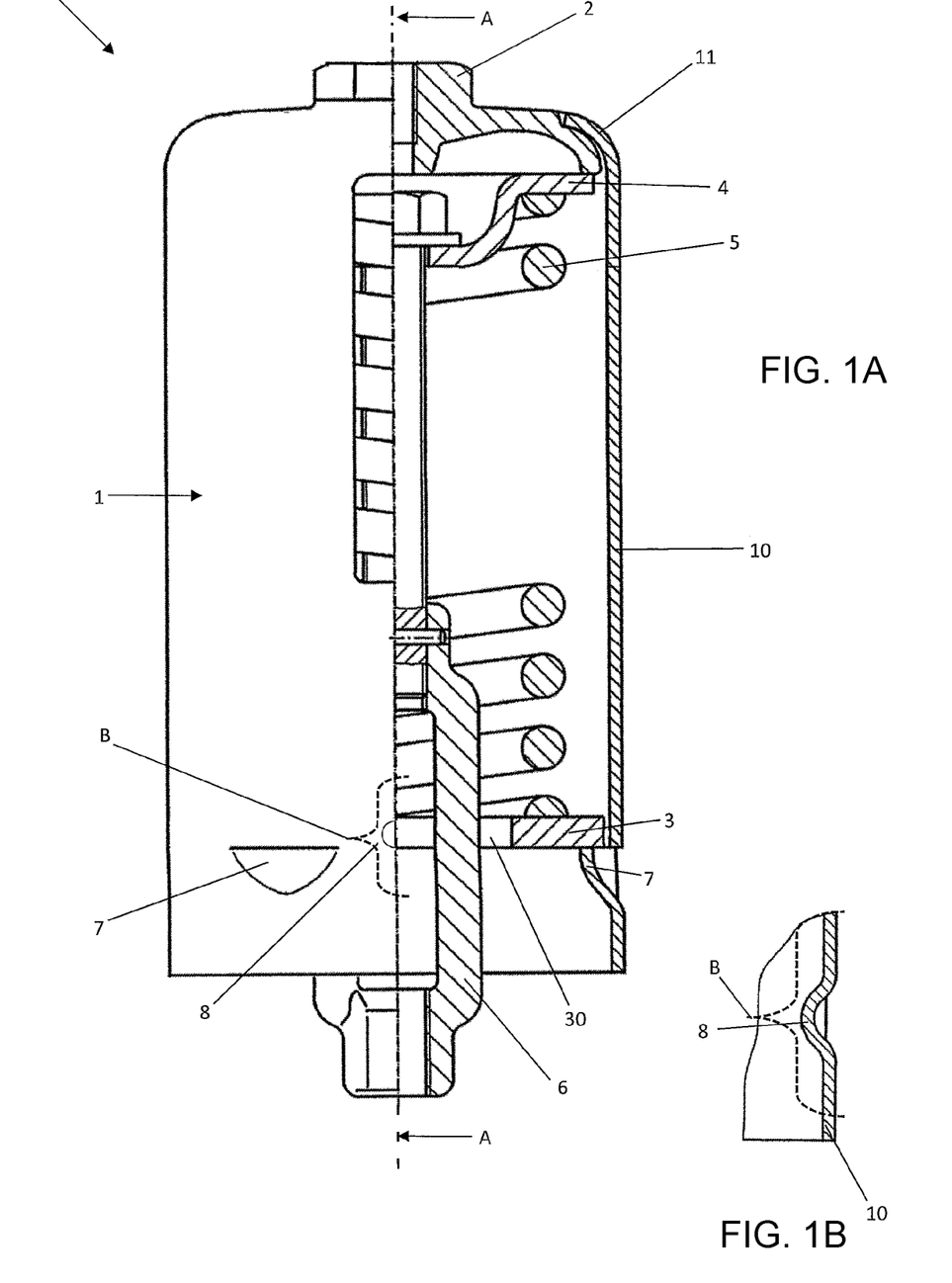

The spring hanger according to the invention 100 has a casing tube 1 that consists here in a tube section 10. The tube section 10 is designed as a hollow cylinder, the cylinder axis of which extends in the longitudinal direction. The tube section 10 is bent at its upper end, and thus at its first end in the longitudinal direction, by forming an upper boundary element 11. At its lower end and thus at its second end in the longitudinal direction, the tube section 10 has projections 7 as well as a locking projection 8 that is also worked by bending into the tube section 10 itself. In any operational situation, the base plate 3, the spring 5 and the spring plate 4 of the spring hanger 100 are placed inside the casing tube 1, the spring 5 being placed in the longitudinal direction between the spring plate 4 and the base plate 3 and exerting a spring force onto the spring plate 4 and the base plate 3. The spring plate 4 is connected with a carrier element 6 that projects beyond the casing tube 1 at the lower end of the casing tube 1. In the embodiment according to FIG. 1, the carrier element 6 is designed as a combination of a threaded bolt and of a turnbuckle. In FIG. 1a, the operational situation of the spring hanger 100 is represented in unloaded condition. In unloaded condition, the spring 5 presses with its spring force the spring plate 4 against the upper boundary element 11 and the base plate 3 against the projections 7. This being, the spring plate 4 is not directly pressed against the upper boundary element 11 but a connecting plate 2 is placed between the upper boundary element 11 and the spring plate 4, connecting plate over which the spring hanger 100 can be hung and fixed to a carrier in a conventional way. In the operational situation in loaded condition, i.e. in the condition in which a load hangs on the carrier element 6 that is connected with the spring plate 4, the spring plate 4 is no longer located on the connecting plate 2 but, compared to the unloaded condition in the longitudinal direction, is moved over a distance in the longitudinal direction towards the base plate 3 by compressing the spring 5. The distance depends on the weight force of the load hung on the carrier element 6.

It can be recognized in FIG. 1a that the projections 7 have respectively an identical design and that they are worked into the tube section 10 of the casing tube 1, first a cut being made in the tube section 10 perpendicularly to the longitudinal direction and then a bending area being bent below the cut towards the inside of the tube section 10. In this way, the projections 7 form a bearing surface that extends in a surface plane perpendicularly to the longitudinal direction and on which the base plate 3 is reliably supported by transferring the force exerted by the spring 5 onto the base plate 3 into the casing tube 1. This spring force is composed, in the loaded condition of the spring hanger 100, of the spring force in unloaded condition and of the weight force of the load that hangs on the carrier element 6. The share of the spring force in loaded condition that arises from the weight force of the load fixed to the carrier element 6 is directly transferred from the casing tube 1 into the carrier to which the spring hanger 100 is fixed by the connecting plate 2 supported on the casing tube 1 by the upper boundary element 11. In alternative embodiments, the spring hanger 100 can also do without the connecting plate 2 so that, in unloaded condition, the spring plate 4 is directly supported on the upper boundary element 11. In such an alternative embodiment, it can be provided that the spring hanger 100 does not hang itself on a carrier but that it is set with the lower end of its tube section 10 on two carriers spaced from each other, the carrier element 6 extending downwards through the carriers. For this alternative embodiment, a resiliently supported hanging of a load on the carrier element 6 can also take place, whereby the casing tube 1 then transfers on its lower side the weight force due to the load directly to the carriers on which the spring hanger 100 is set.

Furthermore, the locking projection 8 is represented in detail in FIG. 1. The locking projection 8 is placed above the retaining projections 7. The concrete design of the locking projection 8 results from the section A-A of the tube section 10 in the area B that is enlarged in FIG. 1b. The locking projection 8 is produced by the simple bending of the tube section 10 and has the shape of a spherical segment.

Figure 2:
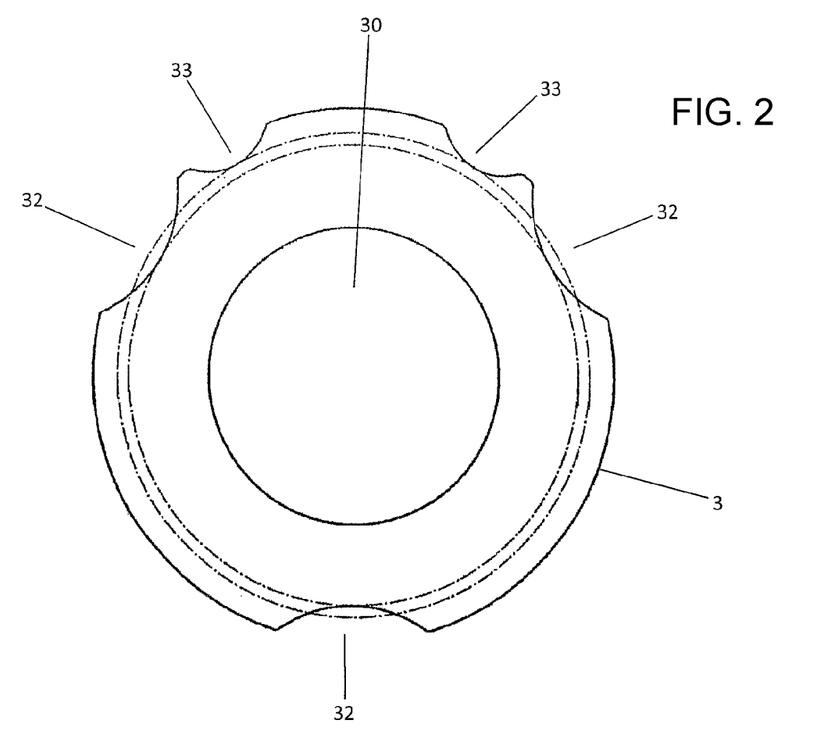
FIG. 2 shows a schematic diagram of the base plate of the spring carrier according to FIG. 1.
Figure 3:
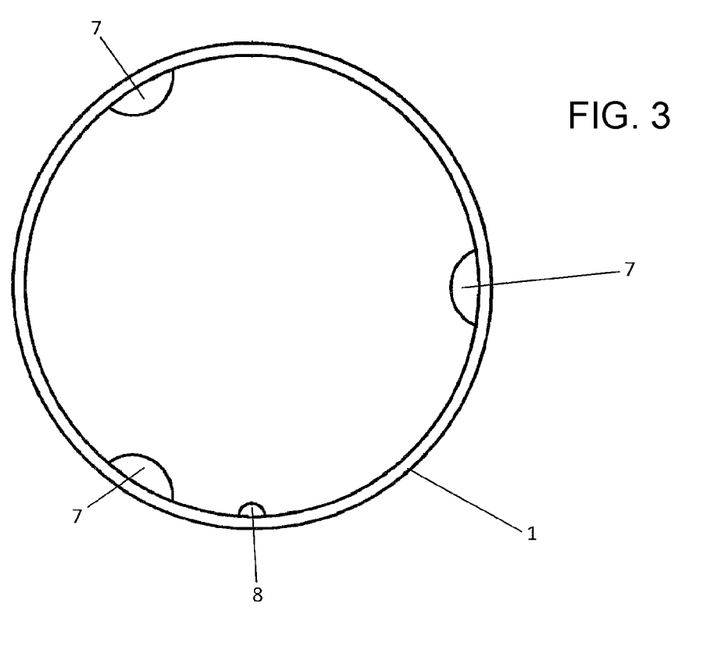
FIG. 3 shows a schematic diagram of a view along the longitudinal direction of the casing tube of the spring carrier according to FIG. 1.
Figure 4:
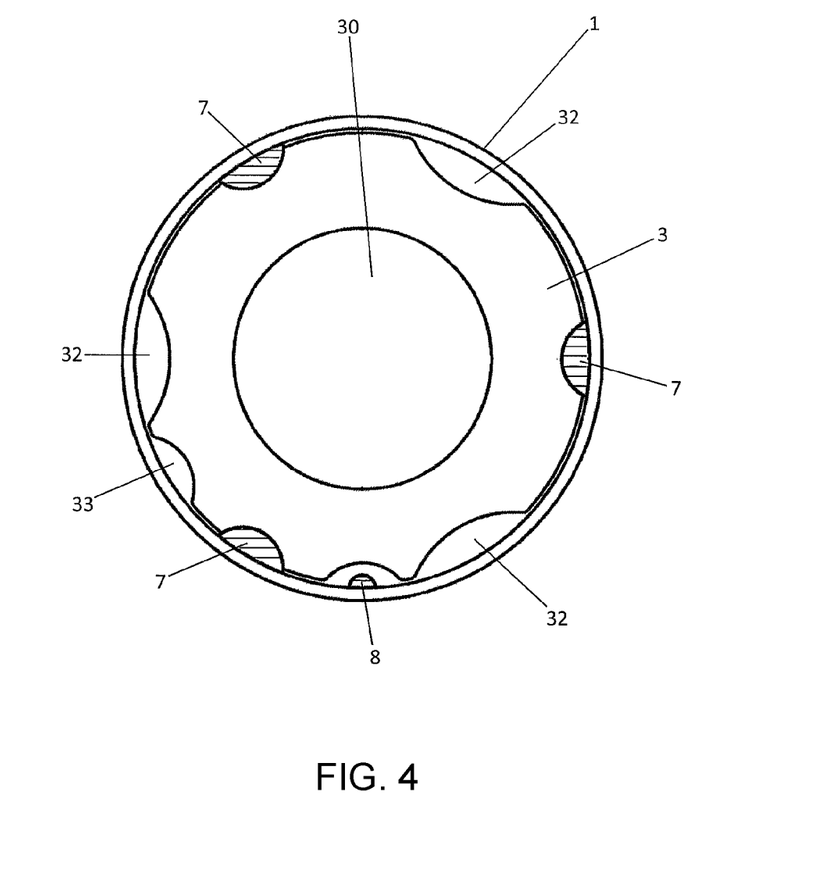
FIG. 4 shows a schematic diagram of a view along the longitudinal direction of the spring carrier according to FIG. 1.

The principle according to the invention of the spring hanger according to the invention 100 that makes possible an easy production of the spring hanger 100 and the production of a robust spring hanger 100 appears particularly clearly from the FIGS. 2 to 4. A view of the base plate along the longitudinal direction and thus the cross-section perpendicularly to the longitudinal direction is schematically represented in FIG. 2. The cross-section of the base plate has a circular shape as an envelope, the recesses being spaced from each other by circular arc sections of the enveloping circular shape. The recesses themselves have a cross-section in the shape of a circle segment and are placed respectively at a particular spot with respect to an angle of rotation about the cylinder axis of the casing tube 1 in which the base plate 3, represented in FIG. 2, is located in the operational situation. This spot is fixed by the center of the angle section over which the respective recess 32 does extend. Moreover, the spot is fixed by the local minimum of the function of the radius that depends on the angle of rotation. It can be recognized in FIG. 2 that the base plate 3 has exactly three recesses 32 that together form the recess arrangement of the base plate 3. These three recesses 32 are spaced from each other respectively at a same recess angular distance of 120° each. Moreover, the base plate 3 has two locking recesses 33 that are placed in an angle section between two adjacent recesses 32. Each of the locking recesses 33 is placed offset to the respectively adjacent recess 32 by an angular distance of 30°. The locking distance between the two locking recesses 33 is 60° and thus twice the distance of the respective locking recess 33 from its adjacent recess 32 and half the recess angular distance.

When producing the spring hanger according to the invention 100, the base plate 3 according to FIG. 2 is inserted from below into the casing tube 1 in a first angular position relative to the casing tube 1. A view along the longitudinal direction from below onto the casing tube 1 is schematically represented in FIG. 3. This being, for simplifying the representation, the upper boundary element 11 has not been represented. Thus, FIG. 3 represents the casing tube 1 with the retaining projections 7 produced by bending in the casing tube 1 itself and with the locking projection 8.

The correspondence of the recess arrangement of the base plate 3 and of the projection arrangement of the casing tube 1, the correspondence of the locking recesses 33 and of the locking projection 8 as well as the corresponding overall arrangement according to the invention of the recess arrangement, of the projection arrangement, of the locking arrangement and of the locking recesses will be explained with reference to the schematically simplified representations of FIGS. 2 and 3 in interaction with FIG. 4. The retaining projections 7 have a cross-section surface perpendicularly to the longitudinal direction that is slightly smaller than the cross-section surface of the recesses 32 of the base plate 3. The locking projection 8 is placed—as not apparent from FIG. 3 in which only the relative positioning perpendicularly to the longitudinal direction is represented—as may be seen from FIG. 1, along the longitudinal direction above the projection arrangement comprising the retaining projections 7. In the mounting situation, the base plate 3 is placed inside the casing tube 1 in a first angular position relative to the casing tube 1, the whole projection arrangement, i.e. all the retaining projections 7, being placed perpendicularly to the longitudinal direction next to the base plate 3 so that the base plate 3 can be displaced along the longitudinal direction past the projection arrangement 7 in the casing tube 1 by compressing the spring 5 when assembling the spring hanger 100. When producing the spring hanger according to the invention 100, the base plate 3 is inserted from below into the casing tube 1 in this first angular position and is displaced upwards in the casing tube 1 beyond the projection arrangement 7 and the locking projection 8. This being, at the same time the locking projection 8 is placed perpendicularly to the longitudinal direction inside a first of the two locking recesses 33. The base plate 3 is then twisted about 60° relative to the first angular position up to a second angular position in which it is located in the operational position. The base plate 3 is then lowered from above onto the retaining projections 7. In this state, the spring hanger 100 is in its operational situation. Since the recesses 32 and the retaining projections 7 are respectively spaced from each other by an angular distance of 120°, the retaining projections 7 are situated in the second angular position respectively exactly in the middle between two adjacent recesses 32. However, the locking projection 8 is situated at the level of the base plate 3 inside the second locking recess 33 so that, in the operational situation, the locking projection 8 is enclosed between the casing tube 1 and the base plate 33. In the operational situation, a twisting of the base plate 3 relative to the casing tube 1 is thus only possible in a very small angle range, namely only until the locking projection 8 hits the base plate 3.

The locking projection 8 in interaction with the second locking recess 33 thus locks the base plate 3 relative to the casing tube 1 in such a manner that the base plate 3 can be twisted about the cylinder axis of the spring hanger 100 only in a very small angle range relative to the casing tube 1. Inside this angle range, the base plate 3 always lies flat on all the retaining projections 7 of the casing tube 1. It is thus ensured that, in the operational situation, the base plate 3 always reliably bears on the projection arrangement that is formed by the retaining projections 7 so that a reliable transfer of force from the base plate 3 to the casing tube 1 is ensured. An unlocking of the base plate 3 relative to the casing tube 1 is only possible when the base plate 3 is removed upwards against the spring force of the spring 5 so far away from the retaining projections 7 that it is situated above the locking projection 8, whereupon it can then be brought again into the first angular position relative to the casing tube 1 and the spring hanger 100 can thus be dismounted.

Figure 5A:
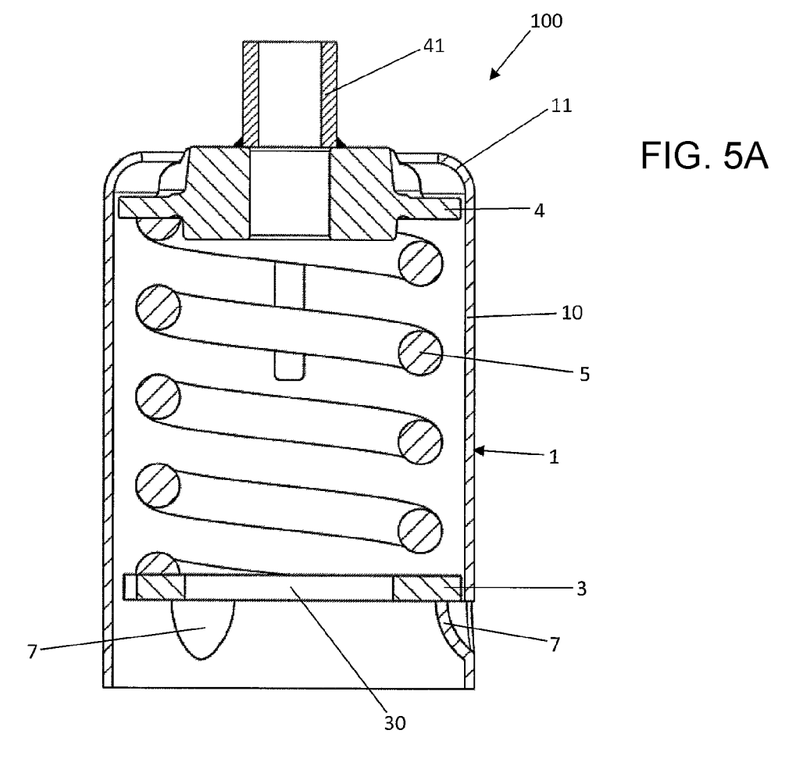
FIG. 5a shows in a schematic diagram a cross section of a further embodiment of the spring carrier according to the invention designed as a spring support.
Figure 5B:
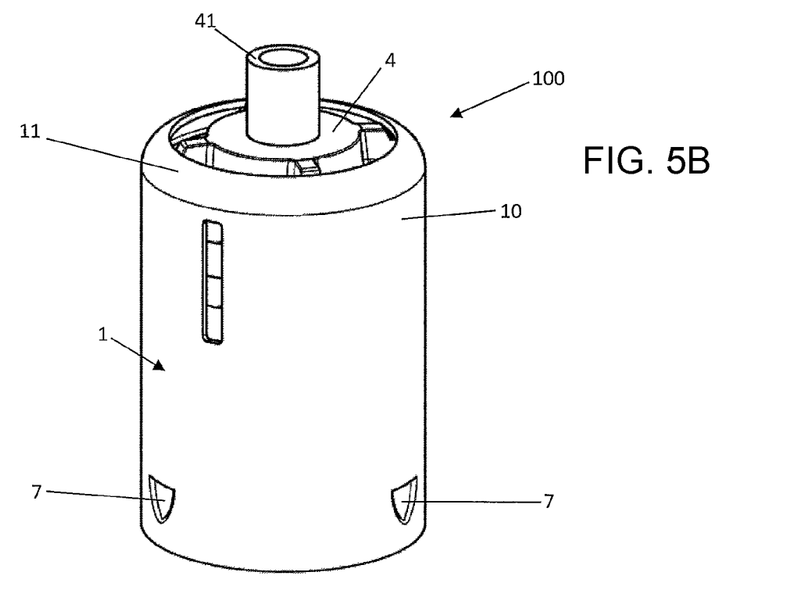

An alternative embodiment of a spring hanger according to the invention 100 is schematically represented in schematic diagrams in FIG. 5. FIG. 5*a* shows a section through the spring hanger according to the invention 100, FIG. 5*b* shows a top view on the spring hanger according to the invention 100. For simplifying, the carrier element 6 of the spring hanger 100 is not represented in FIG. 5. In the embodiment according to FIG. 5, the carrier element 6 is designed as a combination of threaded bolt and nut. The threaded bolt penetrates from below through the spring plate 4 and the tube section 41 placed on the spring plate 4 and is secured against sliding out of the tube section 41 by a nut and a counter nut above the tube section 41. This being, the threaded bolt projects with its lower end beyond the lower end of the casing tube 1 so that a load can be fixed at its lower end.

The spring hanger 100 according to FIG. 5 substantially differs from the spring hanger 100 according to FIGS. 1 to 4 in that no connecting plate 2 is provided for this spring hanger 100 but a tube section 41 is provided instead thereof on the spring plate 4, tube section to which a carrier element 6 can be fixed as explained above. Thus, the spring hanger 100 is designed to be set with the lower end of the casing tube 1 onto two carriers spaced from each other so that a carrier element 6 that is fixed to the tube section 41 and that projects on the lower side beyond the casing tube 1 can extend between the carriers so that a load can be resiliently supported and hung to this carrier element 6 while the casing tube 1 transfers the weight force of the load to the carriers.

An alternative embodiment of a spring carrier according to the invention is represented in a schematic diagram in FIG. 6, this embodiment being designed as a spring support 200. Elements that are similar to the elements represented in FIGS. 1 to 4 of a spring hanger according to the invention 100 are designated with the same reference numerals. A sectional view of the spring support according to the invention 200 is schematically represented in FIG. 5*a*. A view of the support plate 12 of the spring support 200 is represented in the longitudinal direction in FIG. 5*b*.

Figure 6A:
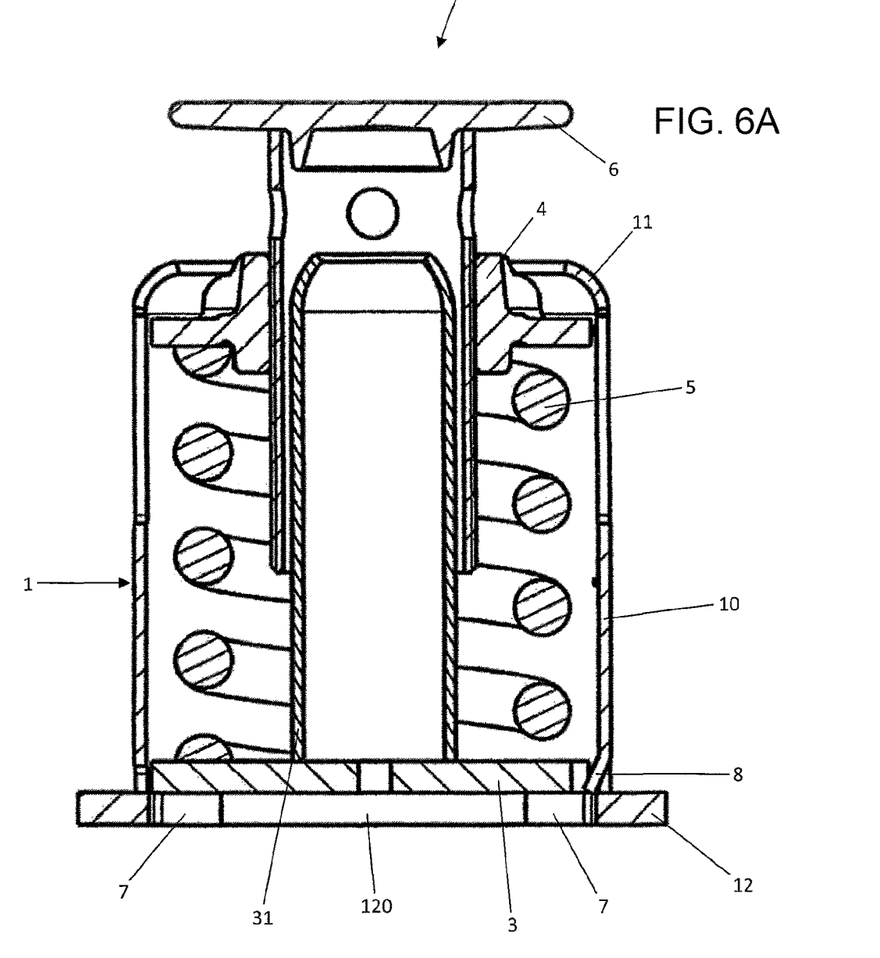
FIG. 6a shows in a schematic diagram a cross section of a further embodiment of the spring carrier according to the invention designed as a spring support.
Figure 6B:
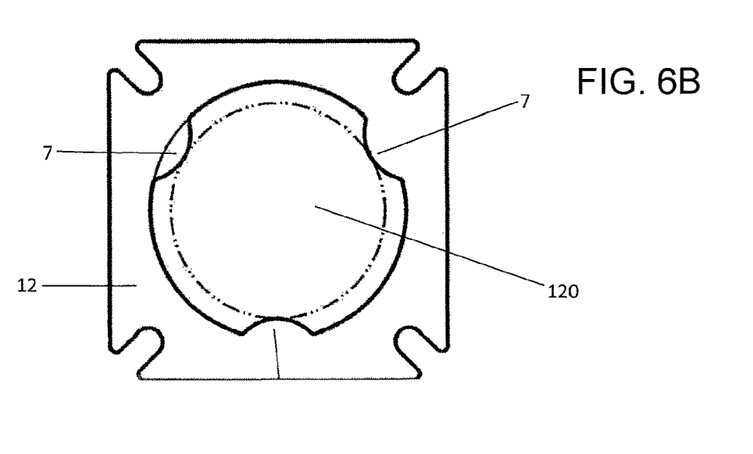

The spring support 200 according to FIG. 6*a* has a casing tube 1 that comprises a tube section 10 and a support plate 12. Similarly to the embodiment according to FIG. 1, the tube section 10 is bent on its upper side by forming an upper boundary element 11. Furthermore, the tube section 10 has, at its lower end, a locking projection 8 that is worked into the tube section 10 in that the tube section 10 is notched along the longitudinal direction at its lower end by two cuts spaced from each other, whereupon the area between the two cuts is bent towards the inside of the tube section 10 by forming the locking projection 8. However, the tube section 10 of the spring support 200 does not have any retaining projections 7. These retaining projections 7 are rather provided in the support plate 12 of the casing tube 1. The support plate 12 is produced independently from the tube section 10 and is then welded to the lower end of the tube section 10. The support plate 12 that is represented with more details in FIG. 6*b* has a recess 120, the support plate 12 forming with its recess 120 a section of the inner circumference of the casing tube 1. Due to the design of the recess 120 in the support plate 12, retaining projections 7 are produced on the inner circumference of the casing tube 1 that are designed similarly to the retaining projections 7 of the spring hanger 100 according to FIGS. 1 to 4. A base plate 3 is used in the spring support 200 as explained in FIGS. 1 to 4.

When assembling the spring support 200 according to FIG. 6, as described for FIGS. 1 to 4, the base plate 3 can be inserted from below into the casing tube 1 while it is situated in a first angular position relative to the casing tube 1 in which the retaining projections 7 are spaced from the base plate 3 perpendicularly to the longitudinal direction. After having inserted the base plate 3 above the locking projection 8, the base plate 3 can then be turned to a second angular position relative to the casing tube 1. In the second angular position, the base plate 3 can then be set onto the retaining projections 7 provided in the support plate 12, the locking projection 8 being placed inside a locking recess 33 of the base plate 3—as explained above for FIGS. 2 to 4—and a twisting of the base plate 3 relative to the casing tube 1 is avoided.

Moreover, for the spring support 200 according to FIG. 6, a guiding tube 31 is welded on the base plate 3, guiding tube that guides the spring carrier 6 that is connected by a thread to the spring plate 4 in the longitudinal direction relative to the spring plate 4 so as to be displaceable. This being, the guiding tube 31 is adapted to the extension of the carrier element 6 in the longitudinal direction so that the spring carrier 6 can slide along the guiding tube 31 so that the guiding tube 31 can absorb forces that act onto the carrier element 6 perpendicularly to the longitudinal direction so that a damaging of the other components of the spring support 200 can be avoided.

LIST OF REFERENCE NUMERALS

1 Casing tube
2 Connecting plate
3 Base plate
4 Spring plate
5 Spring
6 Carrier element
7 Retaining projection
8 Locking projection
10 Tube section
11 Upper boundary element
12 Support plate
30 Recess
31 Guiding tube
32 Recess
33 Locking recess
41 Tube section
100 Spring hanger
120 Recess
200 Spring support

What is claimed is:

1. A spring carrier for use in plant construction to resiliently carry a load, the spring carrier comprising:
   a casing tube comprises a hollow cylinder, the casing tube having a longitudinal axis which extends in a longitudinal direction of the casing tube and an inner circumference which surrounds a clear cross-section of the casing tube,
   a spring plate, a base plate and a spring disposed inside the casing tube and along the longitudinal axis between an upper boundary element and a lower boundary element,
   wherein the spring is disposed between the base plate and the spring plate and applies a spring force respectively acting parallel to the longitudinal axis to the spring plate and the base plate, wherein the spring plate is connected to a carrier element to resiliently carry a component and is displaceable along the longitudinal axis inside a displacement area limited by the upper and the lower boundary elements, the lower boundary element having a projection arrangement having a plurality of retaining projections disposed on the inner circumference of the casing tube, wherein the base plate has a recess arrangement on an outer surface facing the inner circumference of the casing tube, wherein the projection arrangement and the recess arrangement are arrangeable corresponding to each other such that, in a mounting situation, in which the base plate is disposed in a first angular position relative to the casing tube with respect to a rotation about the longitudinal axis, all of the plurality of the retaining projections of the projection arrangement are disposed perpendicularly to the longitudinal axis next to the base plate and, in an operational situation, in which the base plate is disposed in a second angular position relative to the casing tube, the projection arrangement overlaps with the base plate perpendicularly to the longitudinal axis to absorb a force exerted by the spring onto the base plate, wherein at least one locking projection is disposed inside the casing tube and is offset upwards from the projection arrangement, wherein the base plate has at least two locking recesses at a locking angular distance on the outer surface facing the inner circumference of the casing tube, wherein the locking projection and the locking recesses are arranged corresponding to each other such that, in the mounting situation, the locking projection is disposed perpendicularly to the longitudinal axis inside a first of the locking recesses and, in the operational situation, the locking projection is disposed inside a second of the locking recesses.

2. The spring carrier according to claim 1, wherein the plurality of retaining projections are respectively spaced from each other by a retaining projection angular distance and/or the recess arrangement comprises a plurality of recesses respectively spaced from each other by a recess angular distance.

3. The spring carrier according to claim 2, wherein the plurality of retaining projections are uniformly distributed over the inner circumference of the casing tube and/or the plurality of recesses are uniformly distributed over the outer surface of the base plate, and wherein the retaining projection angular distance and/or the recess angular distance is at least 60°.

4. The spring carrier according to claim 3, wherein the retaining projection angular distance and/or the recess angular distance is between 90° and 150°, and the retaining projection angular distance between all adjacent retaining projections of the plurality of retaining projections is identical and/or the recess angular distance between all adjacent recesses of the plurality of recesses is identical.

5. The spring carrier according to claim 2, wherein the plurality of retaining projections each have an identical configuration and/or the plurality of recesses each have an identical configuration.

6. The spring carrier according to claim 2, wherein the plurality of retaining projections is equal to at least three and/or the plurality of recesses is equal to at least three.

7. The spring carrier according to claim 6, wherein the plurality of retaining projections are respectively spaced from each other by a same retaining projection angular distance and/or the plurality of recesses are respectively spaced from each other by a same recess angular distance.

8. The spring carrier according to claim 6, wherein the plurality of retaining projections is equal to at most five and/or the plurality of recesses is equal to at most five.

9. The spring carrier according to claim 2, wherein the plurality of retaining projections and/or the plurality of recesses have a cross-section in a shape of a segment of a circle perpendicularly to the longitudinal axis.

10. The spring carrier according to claim 2, wherein the cross-section of the casing tube is circular, and wherein a cross-section of the base plate, as an envelope, has a shape of a circle, wherein the plurality of recesses are respectively spaced from each other by circular arc segments of the enveloping circle.

11. The spring carrier according to claim 2, wherein the first and the second of the locking recesses are disposed in an angle section between two adjacent recesses of the plurality of recesses.

12. The spring carrier according to claim 11, wherein the locking angular distance between the first and the second of the locking recesses is between 0.25 and 0.75 of the recess angular distance between the two adjacent recesses of the plurality of recesses.

13. The spring carrier according to claim 12, wherein the locking angular distance between the first and the second of the locking recesses is 0.5 of the recess angular distance between the two adjacent recesses of the plurality of recesses.

14. The spring carrier according to claim 13, wherein the locking angular distance between the first and the second of the locking recesses is 60° and the recess angular distance between the two adjacent recesses of the plurality of recesses is 120°.

15. The spring carrier according to claim 12, wherein an angular distance between one of the two adjacent recesses of the plurality of recesses and the first or the second of the locking recesses is between 0.2 and 0.4 of the recess angular distance between the two adjacent recesses of the plurality of recesses and/or 0.5 of the locking angular distance.

16. The spring carrier according to claim 15, wherein an angular distance between one of the two adjacent recesses of the plurality of recesses and the first or the second of the locking recesses is 0.25 of the recess angular distance between the two adjacent recesses of the plurality of recesses.

17. The spring carrier according to claim 2, wherein a cross-section of the locking projection perpendicularly to the longitudinal axis is less than one third of a mean cross-section of the plurality of retaining projections.

18. The spring carrier according to claim 1, wherein the casing tube further comprises a support plate at a lower end of the casing tube, wherein the support plate has a recess which forms a section of the inner circumference of the casing tube through which the spring plate, the base plate and the spring are insertable into the casing tube, wherein the carrier element projects from inside the casing tube at an upper end of the casing tube beyond the casing tube.

19. The spring carrier according to claim 18, further comprising a guide tube which extends, in the operational situation, from the base plate upwards, wherein the guide tube is configured to guide the carrier element and/or the spring plate.

20. The spring carrier according to claim 19, wherein the projection arrangement is disposed on the support plate and/or the locking projection is disposed on the casing tube outside the support plate.

21. The spring carrier according to claim 1, wherein the base plate has a recess through which the carrier element projects from inside the casing tube at a lower end of the casing tube beyond the casing tube.

22. The spring carrier according to claim 21, wherein a connecting plate is provided between the spring plate and the upper boundary element, the connecting plate bearing, in the operational situation, on the upper boundary element.

23. A method for producing a spring carrier, comprising:
inserting a spring plate, a spring and a base plate successively into a casing tube,
wherein the casing tube comprises a hollow cylinder, a longitudinal axis which extends in a longitudinal direction of the casing tube, a locking projection disposed on an inner circumference of the casing tube and a projection arrangement having a plurality of retaining protections disposed on the inner circumference of the casing tube,
wherein the base plate has a locking recess,
wherein the spring plate, the spring and the base plate are inserted into the casing tube in a first direction along the longitudinal axis of the casing tube, and
wherein the locking projection is disposed above the retaining protections of the projection arrangement,
arranging the base plate in a first angular position relative to the casing tube with respect to a rotation about the longitudinal axis and all of the retaining projections of the projection arrangement perpendicularly to the longitudinal axis next to the base plate,
moving the base plate in the first direction along the longitudinal axis above the locking projection and the retaining projections while compressing the spring,
rotating the base plate around the longitudinal axis from the first angular position to a second angular position in which the retaining projections overlap with the base plate perpendicularly to the longitudinal axis, and the locking projection overlaps with the locking recess of the base plate perpendicularly to the longitudinal axis,
moving the base plate is a second direction along the longitudinal axis such that the base plate is lowered onto the retaining projections and the locking projection is arranged inside the locking recess in such a manner that the locking projection is enclosed perpendicular to the longitudinal axis between the base plate and the casing tube,
wherein the second direction is opposite the first direction and moving the base plate is performed while decompressing the spring.

24. The method according to claim 23, wherein rotating the base plate around the longitudinal axis from the first angular position to a second angular position further comprises rotating the base plate at an angle of at least 30° around the longitudinal axis from the first angular position to a second angular position.

25. The method according to claim 24, wherein the angle is in a range of 30° to 90°.

26. The method according to claim 24, wherein the angle is in a range of 45° to 75°.

* * * * *